United States Patent
Fujita

(10) Patent No.: US 9,602,687 B2
(45) Date of Patent: Mar. 21, 2017

(54) COMMUNICATION APPARATUS, METHOD FOR CONTROLLING COMMUNICATION WITH AN EXTERNAL APPARATUS USING GENERATED SESSION AND CHANGED SESSION, AND PROGRAM THEREFOR

(71) Applicant: CANON KABUSHIKI KAISHA, Tokyo (JP)

(72) Inventor: Shunji Fujita, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 271 days.

(21) Appl. No.: 14/254,787

(22) Filed: Apr. 16, 2014

(65) Prior Publication Data

US 2014/0320676 A1    Oct. 30, 2014

(30) Foreign Application Priority Data

Apr. 26, 2013  (JP) ................. 2013-094250

(51) Int. Cl.
  *H04N 1/00*  (2006.01)
  *G06F 3/00*  (2006.01)

(52) U.S. Cl.
  CPC ........... *H04N 1/00461* (2013.01); *G06F 3/00* (2013.01)

(58) Field of Classification Search
  CPC ................ H04N 1/00461; G06F 3/00
  USPC ...................................... 348/211.3
  See application file for complete search history.

(56) References Cited

U.S. PATENT DOCUMENTS

| 8,453,148 B1* | 5/2013 | Hobbs .................. G06F 3/1454 718/102 |
| 2007/0121153 A1* | 5/2007 | Shinkai ................ G11B 27/034 358/1.15 |

FOREIGN PATENT DOCUMENTS

JP  2009-152689 A  7/2009

* cited by examiner

*Primary Examiner* — Nhan T Tran
*Assistant Examiner* — Chan Nguyen
(74) *Attorney, Agent, or Firm* — Canon USA, Inc. IP Division

(57) ABSTRACT

A method for controlling a communication apparatus capable of communicating with an external apparatus includes displaying candidates of data to be transmitted to the external apparatus on a display section, designating transmission target data to be transmitted to the external apparatus out of the displayed candidates, generating a session for communicating with the external apparatus, further designating, after the data transmission for transmitting the designated transmission target data to the external apparatus is started, the transmission target data out of the displayed candidates, by using the generated session, changing, when the transmission target data is further designated, information about the already generated session, and transmitting the further designated transmission target data to the external apparatus, by using the changed session.

20 Claims, 14 Drawing Sheets

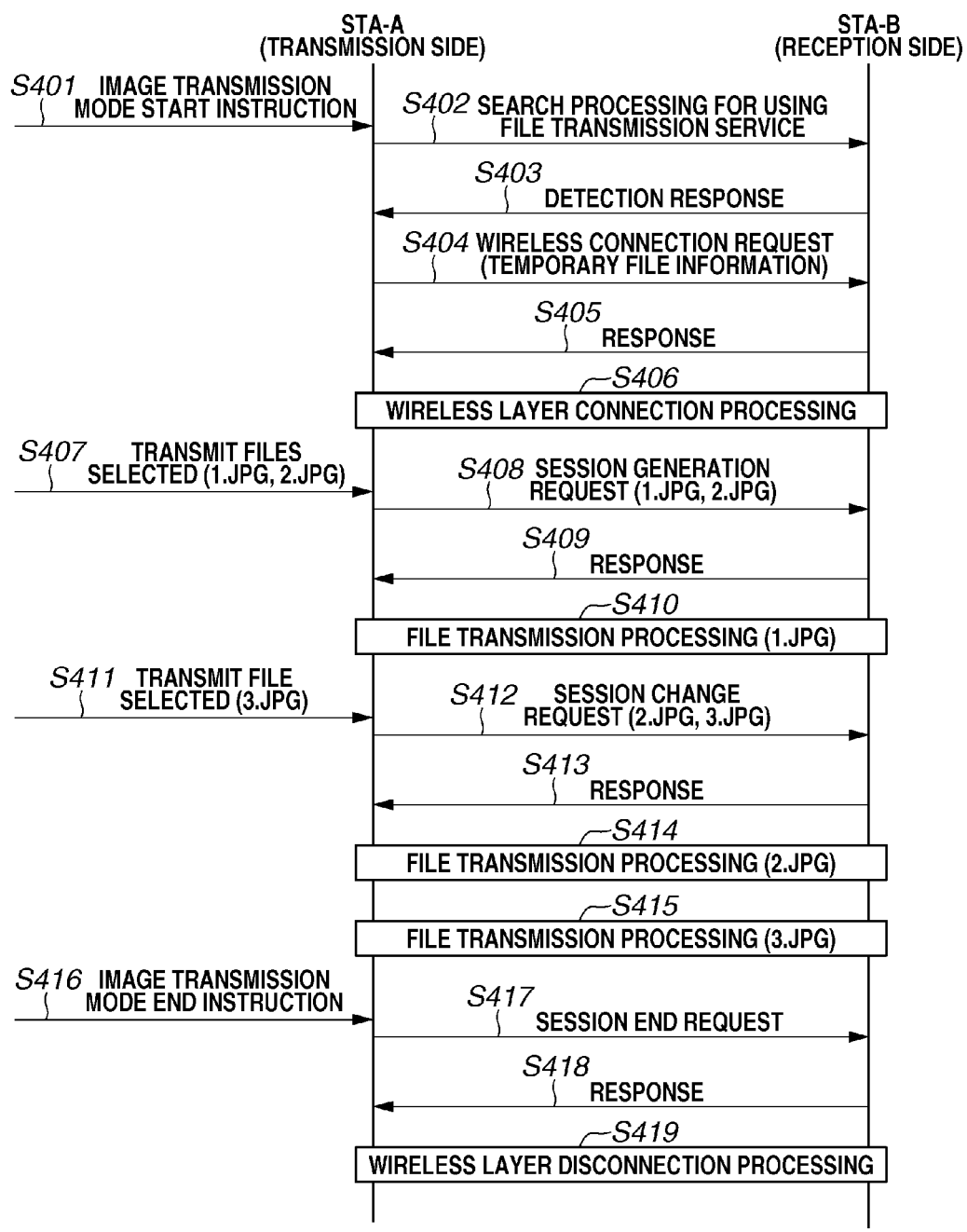

FIG.6A

| JOB ID (4 BYTES) |
|---|
| PARAMETERS (VARIABLE) |

FIG.6B

| JOB ID | PARAMETERS |
|---|---|
| 0X1 (CONNECTION) | · MAC ADDRESS |
| 0X2 (TRANSMISSION) | · NUMBER OF FILES<br>· FILE INFORMATION (FILE NAME, SIZE)<br>× NUMBER OF FILES |
| 0X3 (DISCONNECTION) | · MAC ADDRESS |

FIG.11

| JOB ID | PARAMETERS |
|---|---|
| 0X1 (CONNECTION) | · MAC ADDRESS |
| 0X2 (TRANSMISSION) | · NUMBER OF FILES<br>· FILE INFORMATION (FILE NAME, SIZE, PRECEDENCE FLAG) × NUMBER OF FILES |
| 0X3 (DISCONNECTION) | · MAC ADDRESS |

COMMUNICATION APPARATUS, METHOD FOR CONTROLLING COMMUNICATION WITH AN EXTERNAL APPARATUS USING GENERATED SESSION AND CHANGED SESSION, AND PROGRAM THEREFOR

BACKGROUND OF THE INVENTION

Field of the Invention

The present invention relates to a communication apparatus, a method for controlling the communication apparatus, and a program therefor.

Description of the Related Art

With the spread of wireless communications, there has been proposed a technique for implementing a wireless communication function in a portable terminal, such as a digital camera, and transmitting image files (Japanese Patent Application Laid-Open No. 2009-152689). For example, in the case of file transmission using the conventional file transmitting service, a session is first generated and then file transmission is performed in the session. This method for image file transmission can be used for the transmission from a digital camera.

In a case where a method for generating a session in this way is employed, when specifying an additional file to be transmitted during file transmission processing, a new session May be generated aside from the session under the file transmission processing.

SUMMARY OF THE INVENTION

The present invention is directed to a communication apparatus capable of communicating with an external apparatus. The communication apparatus includes a display unit configured to display candidates of data to be transmitted to the external apparatus on a display section, a designation unit configured to designate transmission target data to be transmitted to the external apparatus out of the candidates displayed by the display unit, a control unit configured to control a session for communicating with the external apparatus, and a transmission unit configured to transmit the transmission target data designated by the designation unit to the external apparatus with the use of the session generated by the control unit. Even after data transmission by the transmission unit is started, the designation unit can further designate the transmission target data out of the candidates displayed by the display unit. When the transmission target data is further designated by the designation unit, the control unit performs control to change information about an already generated session. The transmission unit transmits the further designated transmission target data to the external apparatus with the use of the session changed by the control unit.

Further features of the present invention will become apparent from the following description of exemplary embodiments with reference to the attached drawings.

BRIEF DESCRIPTION OF THE DRAWINGS

FIGS. 4A and 4B are sequence diagrams illustrating communications between communication apparatuses according to a first exemplary embodiment.

FIGS. 6A and 6B illustrate examples of job specifications between tasks of the communication apparatus according to the first exemplary embodiment.

FIG. 11 illustrates examples of job specifications between tasks of each communication apparatus according to the second exemplary embodiment.

DESCRIPTION OF THE EMBODIMENTS

Various exemplary embodiments, features, and aspects of the invention will be described in detail below with reference to the drawings.

A communication apparatus according to a first exemplary embodiment will be described in detail below with reference to the accompanying drawings. Although, in the following descriptions, a wireless local area network (LAN) system conforming to the Institute of Electrical and Electronics Engineers (IEEE) 802.11 series standard is used, the communication form is not limited to the wireless LAN conforming to the IEEE 802.11 series standard.

A hardware configuration of an example suitable for the present exemplary embodiment will be described below.

Figure 1:
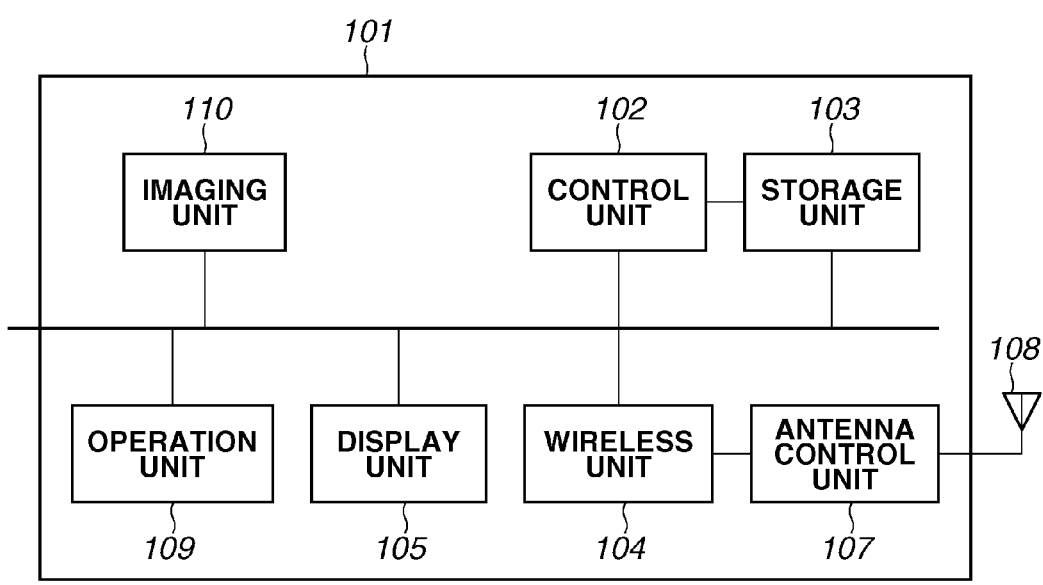
FIG. 1 illustrates a hardware function block diagram of a communication apparatus.

FIG. 1 is a block diagram illustrating an exemplary configuration of each communication apparatus (described below) according to exemplary embodiments of the present invention.

FIG. 1 illustrates an overall configuration of a communication apparatus 101.

A control unit 102 executes a control program stored in a storage unit 103 to control the entire communication apparatus 101. A control unit 102 includes one or a plurality of processors including a central processing unit (CPU) or a microprocessor unit (MPU). The control unit 102 also controls communication parameter settings with other communication apparatuses 101.

A storage unit 103 stores control programs to be executed by the control unit 102, and various information, such as communication parameters. The storage unit 103 may store image data and files generated by a communication apparatus or received from an external apparatus. The storage unit 103 includes various memories, such as a read-only memory (ROM), a random access memory (RAM), a hard disk drive (HDD), and a flash memory. Various operations (described below) are implemented when the control unit 102 executes control programs stored in the storage unit 103.

A wireless unit 104 performs wireless LAN communication conforming to the IEEE 802.11 series standard.

A display unit 105 displays various information. The display unit 105 such as a liquid crystal display (LCD) and a light emitting diode (LED) has a function of outputting visually recognizable information, or a function of outputting sound, such as a speaker. The display unit 105 has a function of outputting either visual information or sound information.

An antenna control unit 107 controls an antenna 108 to transmit and receive signals via wireless communication.

An operation unit 109 is used by a user to input various instructions to operate a communication apparatus. The operation unit 109 includes various buttons and a touch panel.

An imaging unit 110 includes an optical lens, a complementary metal-oxide semiconductor (CMOS) sensor, and a digital image processing unit, and converts an analog signal input via the optical lens into digital data to generate image data. The image data generated by the imaging unit 110 is stored in the storage unit 103.

FIG. 1 illustrates only an exemplary hardware configuration. The communication apparatus 101 may have a hardware configuration other than the one illustrated in FIG. 1.

Figure 2:
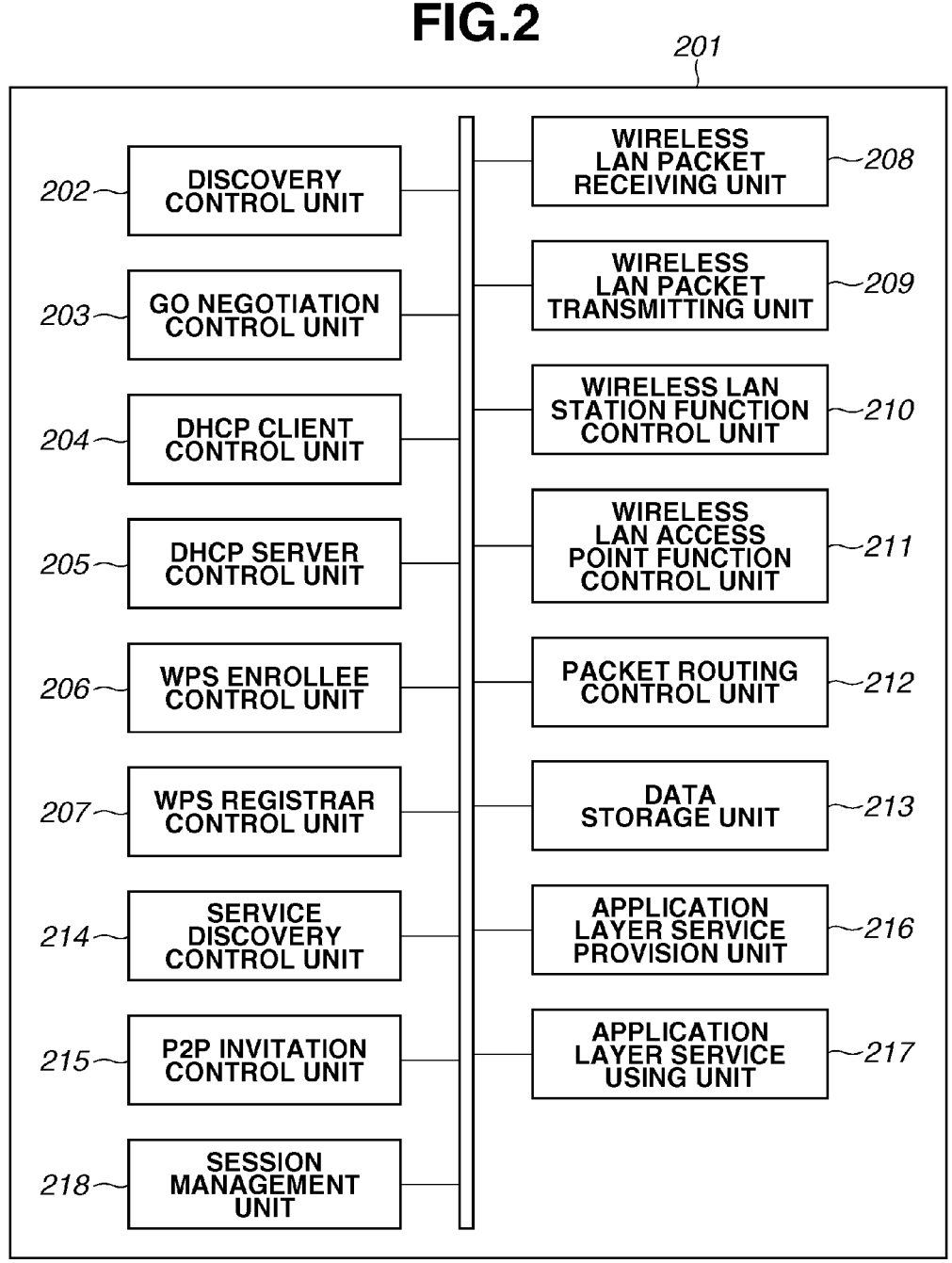
FIG. 2 illustrates a software function block diagram of the communication apparatus.

FIG. 2 is a block diagram illustrating an exemplary software function block for implementing communication control functions (described below).

FIG. 2 illustrates an overall configuration of a software function block 201.

A Discovery control unit 202 activates processing for searching for a communication apparatus as a communication partner.

A GO Negotiation control unit 203 performs control based on the Wi-Fi Direct protocol specification to determine the roles of two communication apparatuses in the wireless layer, i.e., determine an apparatus serving as a wireless LAN access point and an apparatus serving as a wireless LAN station. In the Wi-Fi Direct protocol, the communication apparatus which functions as the wireless LAN access point is referred to as a peer-to-peer (P2P) group owner (hereinafter referred to as GO), and the communication apparatus which functions as the wireless LAN station is referred to as a P2P client (hereinafter referred to as CL). When a communication apparatus serves as a GO or a wireless LAN access point, a wireless LAN access point function control unit 211 (described below) of the communication apparatus is activated. When a communication apparatus serves as a CL or a wireless LAN station, a wireless LAN station function control unit 210 (described below) of the communication apparatus is activated. This GO Negotiation protocol is determined by the Wi-Fi Direct protocol specification. The Wi-Fi Direct protocol specification is not an important point of the present invention, and description thereof will be omitted. In the Wi-Fi Direct protocol, a network configured by the GO is referred to as a P2P group. In the present specification, a network may be described as a P2P group, and these have an identical meaning. In the present specification, the P2P group owner (GO), the P2P client (CL), and a group of communication apparatuses whose roles have not been determined are collectively referred to as P2P devices.

A Dynamic Host Configuration Protocol (DHCP) client control unit 204 is activated when the GO Negotiation control unit 203 determines the role of its own communication apparatus as a wireless LAN station.

A DHCP server control unit 205 is activated when the GO Negotiation control unit 203 determines the role of its own communication apparatus as a wireless LAN access point.

A Wi-Fi Protected Setup (WPS) Enrollee control unit 206 receives communication parameters required for wireless LAN communication from other WPS registrar apparatuses. Similar to the DHCP client control unit 204, the WPS Enrollee control unit 206 operates when its own communication apparatus functions as a wireless LAN station.

A WPS registrar control unit 207 provides other WPS Enrollee apparatuses with communication parameters required for wireless LAN communication. Similar to the DHCP server control unit 205, the WPS registrar control unit 207 operates when its own communication apparatus functions as a wireless LAN access point. The communication parameters offered by other WPS registrar apparatuses include a Service Set Identifier (SSID) as a network identifier, an encryption key, an encryption method, an authentication key, and an authentication method.

A wireless LAN packet receiving unit 208 and a wireless LAN packet transmission unit 209 manage transmission and reception of all packets including the upper layer communication protocol.

The wireless LAN station function control unit 210 performs authentication and encryption processing when its own communication apparatus operates as a wireless LAN station, and participates in a wireless network built by the communication apparatus operating as a wireless LAN access point.

The wireless LAN access point function control unit 211 builds a wireless network when its own communication apparatus operates as a wireless LAN access point, performs authentication and encryption processing, and manages a communication partner. The wireless LAN station function control unit 210 and the wireless LAN access point function control unit 211 can operate exclusively or simultaneously.

A packet routing control unit 212 bridges communication packets and performs routing on them when the wireless LAN access point function control unit 211 is operating.

A data storage unit 213 stores software itself, the wireless LAN parameters, and various tables, such as a DHCP address table and an Address Resolution Protocol (ARP) table.

A Service Discovery control unit 214 deals with the Service Discovery function specific to Wi-Fi Direct. The Service Discovery function transmits and receives action frames established by the IEEE 802.11u standard to exchange service information held by the communication partner. Specifically, the Service Discovery function transmits SD Query and receives SD Response as a response. Alternatively, it receives SD Query from the communication partner, and transmits thereto SD Response as a response. SD Response includes information about the type of service, specifically, a file transmitting service, a print service, a video streaming service, and so on.

A P2P Invitation function control unit 215 controls the Invitation function specified by the Wi-Fi Direct Standard. This Invitation function is defined in the Wi-Fi Direct protocol specification, and redundant description thereof will be omitted. The Invitation function is used by a GO apparatus or a CL apparatus to cause a P2P device whose role has not been determined, to make a connection as a P2P client.

A file transmitting service provision unit 216 provides a file transmitting service in the application layer. The application layer refers to a service provision layer in the fifth and higher layers in the Open Systems Interconnection (OSI)

model. The file transmitting service performs processing for transmitting and receiving various requests, responses, and transmission target files by using the Hypertext Transfer Protocol (HTTP) protocol.

A file transmitting service using unit 217 in the application layer uses a service of the communication partner provided by the file transmitting service provision unit 216 in the application layer.

A session management unit 218 manages a logical connection in the file transmitting service. When using the file transmitting service, the session management unit 218 first transmits transmission target file information to the communication partner to request it to generate a session (session generation request). When providing the file transmitting service, the session management unit 218 determines whether reception of files is possible based on the contents of the received transmission target file information, and, if reception of files is determined to be possible, returns a success response in response to the session generation request. The transmission target file information includes the number of files, a total size, and a file name. When session generation is determined to be possible, the session management unit 215 performs connection processing in the wireless layer. Information related to session management is exchanged by using public action frames specified by the IEEE 802.11 series standard.

Not all of the function blocks illustrated in FIG. 2 are not necessarily implemented by software. At least a part of them may be implemented by hardware devices. Each function block illustrated in FIG. 2 has a correlation with each other. The function blocks illustrated in FIG. 2 are to be considered as an example. A plurality of function blocks may constitute one function block, and any function block may be divided into a plurality of blocks having a plurality of functions.

In the present exemplary embodiment, the file transmitting service in the application layer is achieved by an apparatus which provides a service (service provision apparatus) and an apparatus which uses the service (service using apparatus). The service provision apparatus and the service using apparatus are applicable to mobile phones, such as smart phones, tablet devices, and digital cameras.

Figure 3:
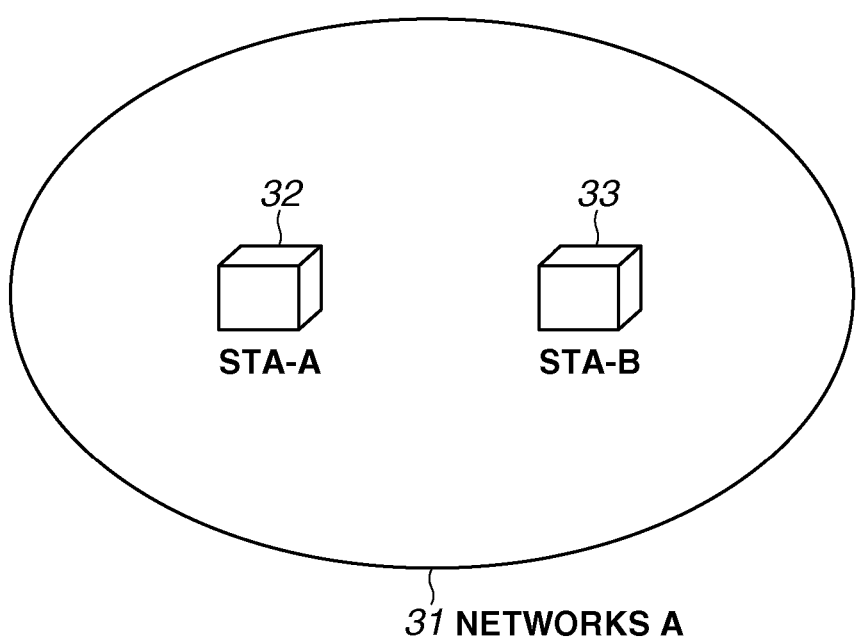
FIG. 3 illustrates an exemplary network configuration applied to the present invention.

FIG. 3 illustrates a communication apparatus A 32 (hereinafter referred to as STA-A), a communication apparatus B 33 (hereinafter referred to as STA-B), and a network A 31 (hereinafter referred to as network A) including the STA-A and the STA-B. Each of the two apparatuses has the configurations illustrated in FIGS. 1 and 2.

<Basic Sequence>

Figure 4A:
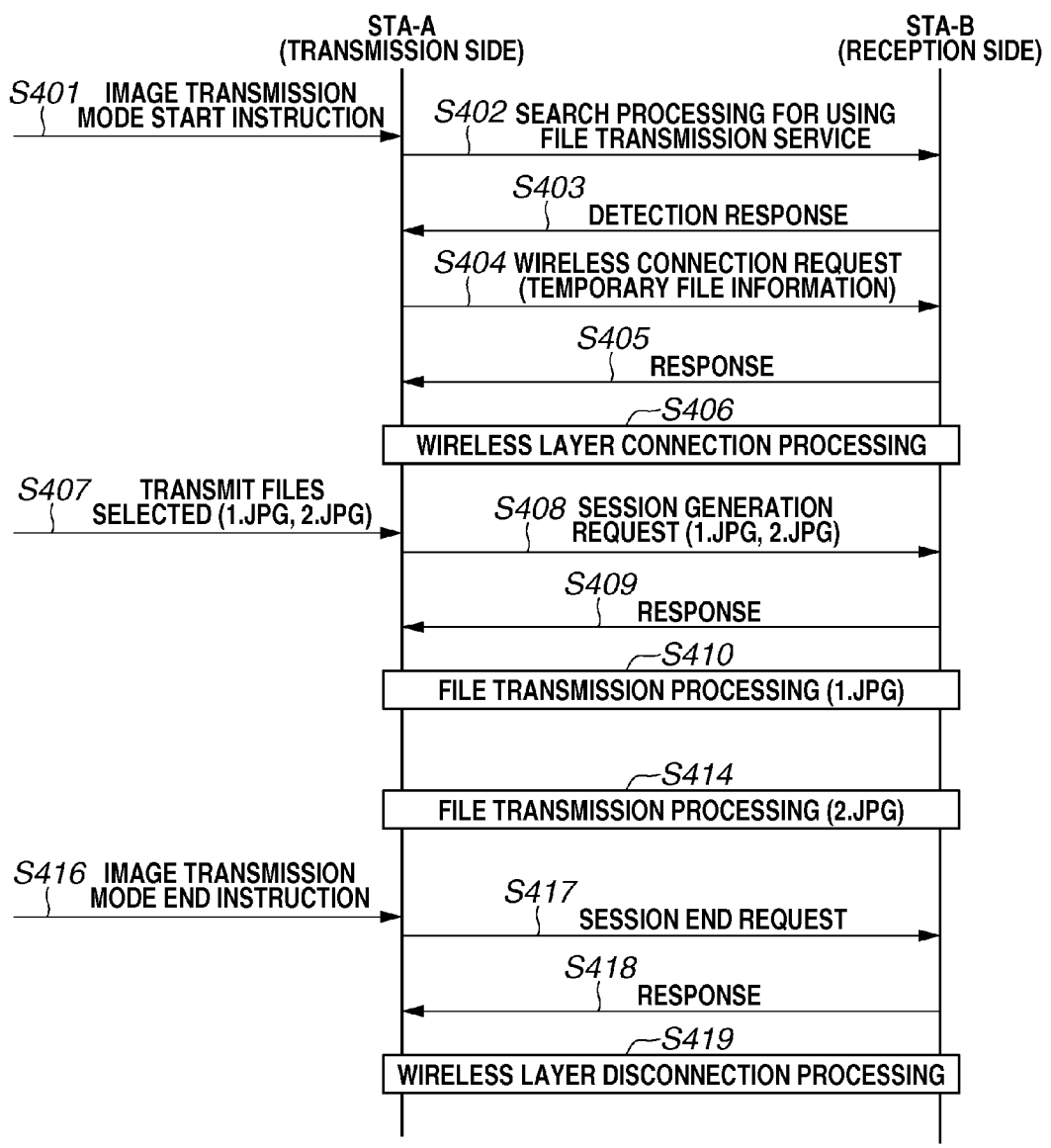

FIG. 4A is a schematic view illustrating basic operating sequences performed between each apparatus when the STA-A transmits two image files stored in the storage unit 103 to the STA-B.

In the example illustrated in FIG. 4A, the STA-A operates as a communication apparatus on the transmission side which uses the file transmitting service, and the STA-B operates as a communication apparatus on the reception side which provides the file transmitting service.

In step S401, the STA-A receives an image transmission mode start instruction through a user operation. In step S402, to use the file transmitting service, the STA-A transmits an inquiry signal to search for a communication apparatus which provides the relevant service.

In step S403, upon reception of the above-described inquiry signal, the STA-B transmits a detection response signal to the STA-A.

In step S404, upon reception of the detection response signal, the STA-A transmits to the STA-B a session generation request signal having transmission target file information appended thereto to establish a logical connection for the file transmitting service with the STA-B.

In step S405, upon reception of the session generation request signal, the STA-B transmits a success response signal to the STA-A.

In step S406, upon reception of the success response signal, the STA-A performs wireless layer connection processing between STA-B. The wireless layer connection processing is connection processing based on the above-described Wi-Fi Direct protocol specification. Specifically, one of the STA-A and the STA-B serves as a GO (P2P group owner), and another serves as a CL (P2P client). The CL performs the connection processing by participating in the wireless network built by the GO. After establishment of wireless layer connection, Internet Protocol (IP) address setting processing conforming to the DHCP is performed between the GO and the CL.

After establishment of wireless layer connection, transmission target files (a type of transmission target data) are selected. Specifically, the STA-A displays on the display unit 105 a screen (for example, a file ID list) for selecting transmission target files, and transmission target files are selected through a user operation on the STA-A. In step S407, two image files (1.JPG, 2.JPG) are selected as transmission target files.

In step S408, the STA-A transmits information about the selected transmission target files to the STA-B to request it to generate a session (session generation request). The session generation request may be made by using public action frames defined by the IEEE 802.11 series standard, or made based on the HTTP protocol. In step S409, upon reception of the session generation request signal, the STA-B determines that reception of the specified transmission target files is possible, and transmits a success response signal to the STA-A. Thus, file transmission between the STA-A and the STA-B is made possible.

In steps S410 and S414, upon reception of the success response, the STA-A performs processing for transmitting image files (1.JPG, 2.JPG) to the STA-B based on the transmitted transmission target file information.

In step S416, the STA-A receives an instruction to end an image transmission mode, through a user operation. In step S417, the STA-A transmits a session end request signal to the STA-B to end the logical connection for the file transmitting service with the STA-B. In step S418, upon reception of the session end request signal, the STA-B transmits a success response signal to the STA-A. In step S419, the STA-B disconnects the connection in the wireless layer. This completes a basic file transmission sequence.

<A Case Where an Additional Transmission Target File is Selected>

The following describes sequences performed between the STA-A and the STA-B when a new transmission target file is additionally selected after selection of transmission target files, with reference to FIG. 4B.

The sequences illustrated in FIG. 4B differ from those illustrated in FIG. 4A with respect to processing in step S411 and subsequent steps. In step S411, during transmission or upon completion of transmission of one image file (1.JPG) in step S410, an image file (3.JPG) is selected as a transmission target file through a user operation.

In step S412, in this case, the STA-A transmits information about an untransmitted transmission target file and information about a newly selected transmission target file to the STA-B to request it to change the relevant session (session change request). In the example illustrated in FIG.

4B, the session change request includes information about 2.JPG as an untransmitted file (untransmitted data) and 3.JPG as a newly selected file.

In step S413, upon reception of the session change request signal, the STA-B determines whether reception of the specified transmission target file is possible. When reception of the specified transmission target file is determined to be possible, the STA-B transmits a success response signal to the STA-A.

Then, the STA-B prepares for reception of the relevant files (2.JPG, 3.JPG). In steps S414 and S415, upon reception of the success response, the STA-A performs processing for transmitting the image files (2.JPG, 3.JPG) to the STA-B based on the changed transmission target file information.

When a new transmission target is additionally selected as described above, the STA-A according to the present exemplary embodiment does not generate a new session but changes information of the already generated session and transmits the additional transmission target file.

<Processing of Each Task>

Figure 5:
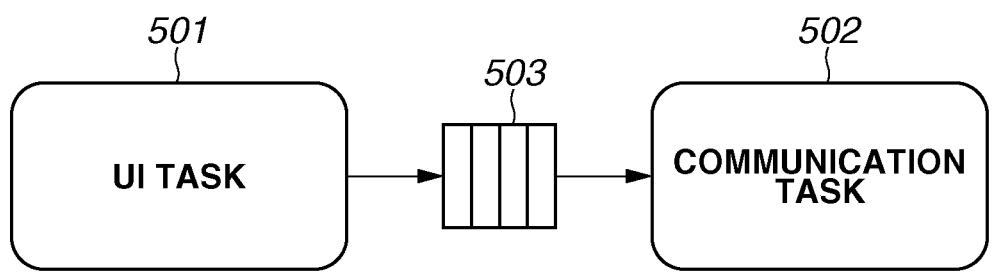
FIG. 5 illustrates a software task configuration related to a file transmission function of each communication apparatus according to the first exemplary embodiment.

FIG. 5 schematically illustrates a software task configuration related to the file transmission function described with reference to FIGS. 4A and 4B. Although software itself executes processing in the following descriptions, actual processing is naturally implemented by hardware which has read software.

A UI (user interface) task 501 performs processing based on a user operation. The UI task 501 transmits a job to a communication task 502 according to the contents of the user operation. The communication task 502 controls wireless communication based on a job received from the UI task 501. A job queue 503 is used to transmit a job from the UI task 501 to the communication task 502.

As illustrated in FIG. 5, by providing the job queue 503, a job for transmitting a new file can be added on the UI task 501 even if an unprocessed transmission job remains in the communication task 502.

FIG. 6A illustrates a data format of a job. A job is composed of a job identifier (ID) and parameters.

FIG. 6B illustrates the contents of the job ID and parameters included in a job. There are three different job IDs: 0x1 (connection), 0x2 (transmission), and 0x3 (disconnection). Parameters as illustrated in FIG. 6B are defined for each job ID.

Figure 7:
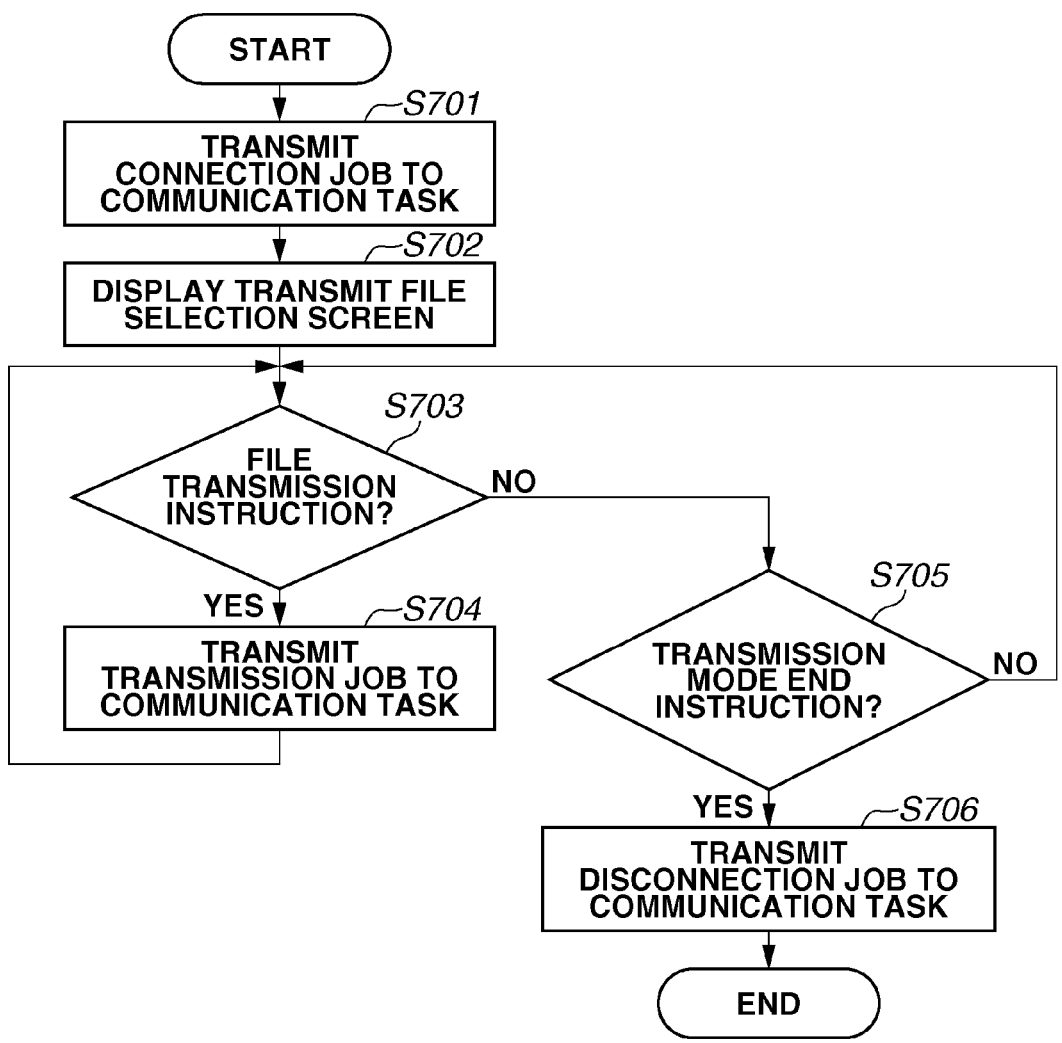
FIG. 7 is a flowchart illustrating processing of a user interface (UI) task of the communication apparatus according to the first exemplary embodiment.

FIG. 7 is a flowchart illustrating control procedures by the UI task 501 related to the file transmission processing described with reference to FIGS. 4A and 4B. The UI task 501 is enabled at the timing when the image transmission mode is entered, and disabled at the timing when the image transmission mode is exited. Each step of this flowchart is processed when the control unit 102 executes a program stored in the storage unit 103. Referring to FIG. 7, descriptions of the processing for searching for a receiving apparatus described with reference to steps S401 to S405 will be omitted. This flowchart is activated on the premise that the UI task 501 has information about the detected receiving apparatus (Media Access Control (MAC) address).

In step S701, to perform wireless layer connection with the detected receiving apparatus, the UI task 501 transmits a connection job to the communication task 502. The parameters of the connection job include the MAC address of the receiving apparatus.

In step S702, the UI task 501 displays a transmission target file selection screen for allowing the user to select an image file to be transmitted to the receiving apparatus.

When the UI task 501 determines that a transmission target file is selected by the user and a transmission instruction is accepted in the transmission target file selection screen (YES in step S703), then in step S704, the UI task 501 transmits a transmission job to the communication task 502 based on the contents of the transmission instruction. The parameters of the transmission job include the number of selected image files, and the name and size of each image file.

On the other hand, when the UI task 501 accepts a transmission mode end instruction from the user in the transmission target file selection screen (YES in step S705), then in step S706, the UI task 501 transmits a disconnection job to the communication task 502 to end the wireless layer connection with the receiving apparatus.

Figure 8A:
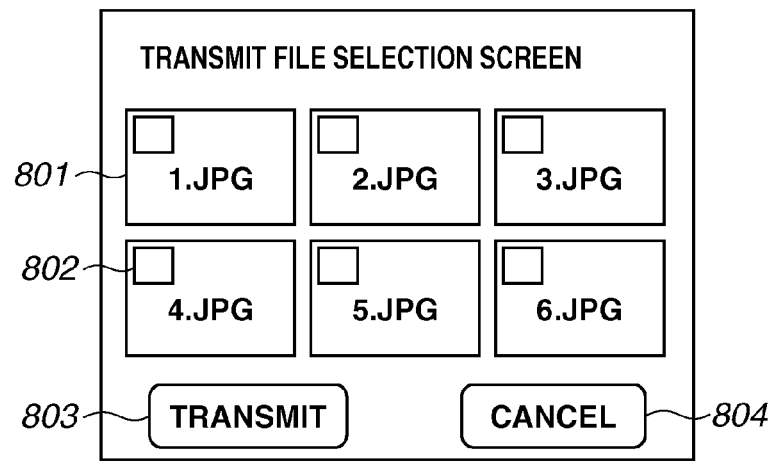
FIGS. 8A, 8B, and 8C illustrate examples of a graphical user interface (GUI) screen of the communication apparatus according to the first exemplary embodiment.
Figure 8B:
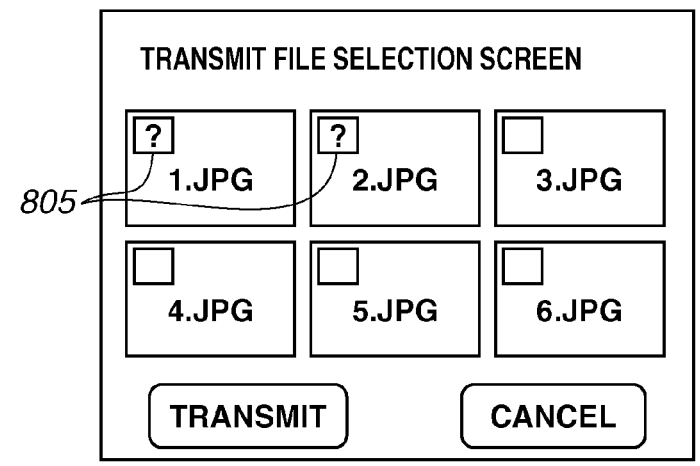
Figure 8C:
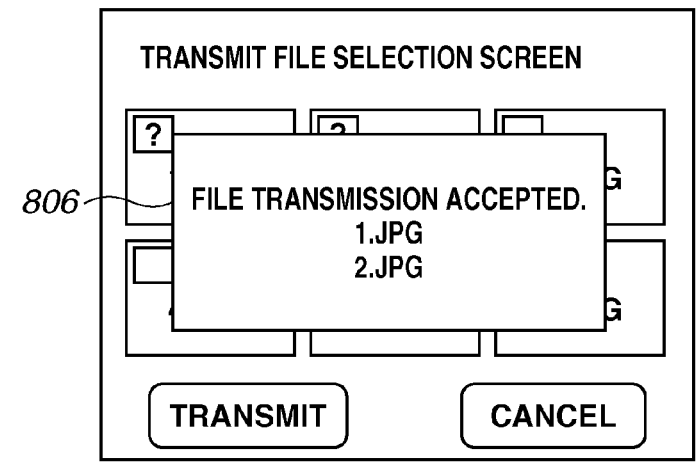

FIGS. 8A, 8B, and 8C illustrate examples of the above-described transmission target file selection screen.

FIG. 8A illustrates the transmission target file selection screen displayed in step S702. The transmission target file selection screen includes an image file thumbnail 801 and a check box 802 indicating selection. FIG. 8A illustrates the initial state and therefore none of image files is selected. When a TRANSMIT button 803 is pressed in a state where at least one image file is selected, step S704 is executed. On the other hand, when a CANCEL button 804 is pressed, step S706 is executed.

FIG. 8B illustrates the transmission target file selection screen when two image files (1.JPG, 2.JPG) are selected. Check boxes 805 indicate that relevant files are selected.

FIG. 8C illustrates a screen displayed when the TRANSMIT button 803 is pressed and step S704 is executed. A pop-up screen 806 notifies the user that step S704 has been executed, and notifies names of transmission target files.

Although, in the present exemplary embodiment, candidates of transmission target files are specified in an image file list, the configuration is not limited thereto. For example, transmission target files can be specified even in a case where image files are displayed one by one in response to a user operation ("image advancing"). In this case, for example, it is preferable that the user can instruct transmission of one image file, and then, while performing image advancing, instruct transmission of a desired image file. In this case, by making a request for a session change reflecting information after transmission target is changed each time the user issues a transmission instruction, specified image files can be sequentially transmitted without generating a plurality of sessions.

Figure 9:
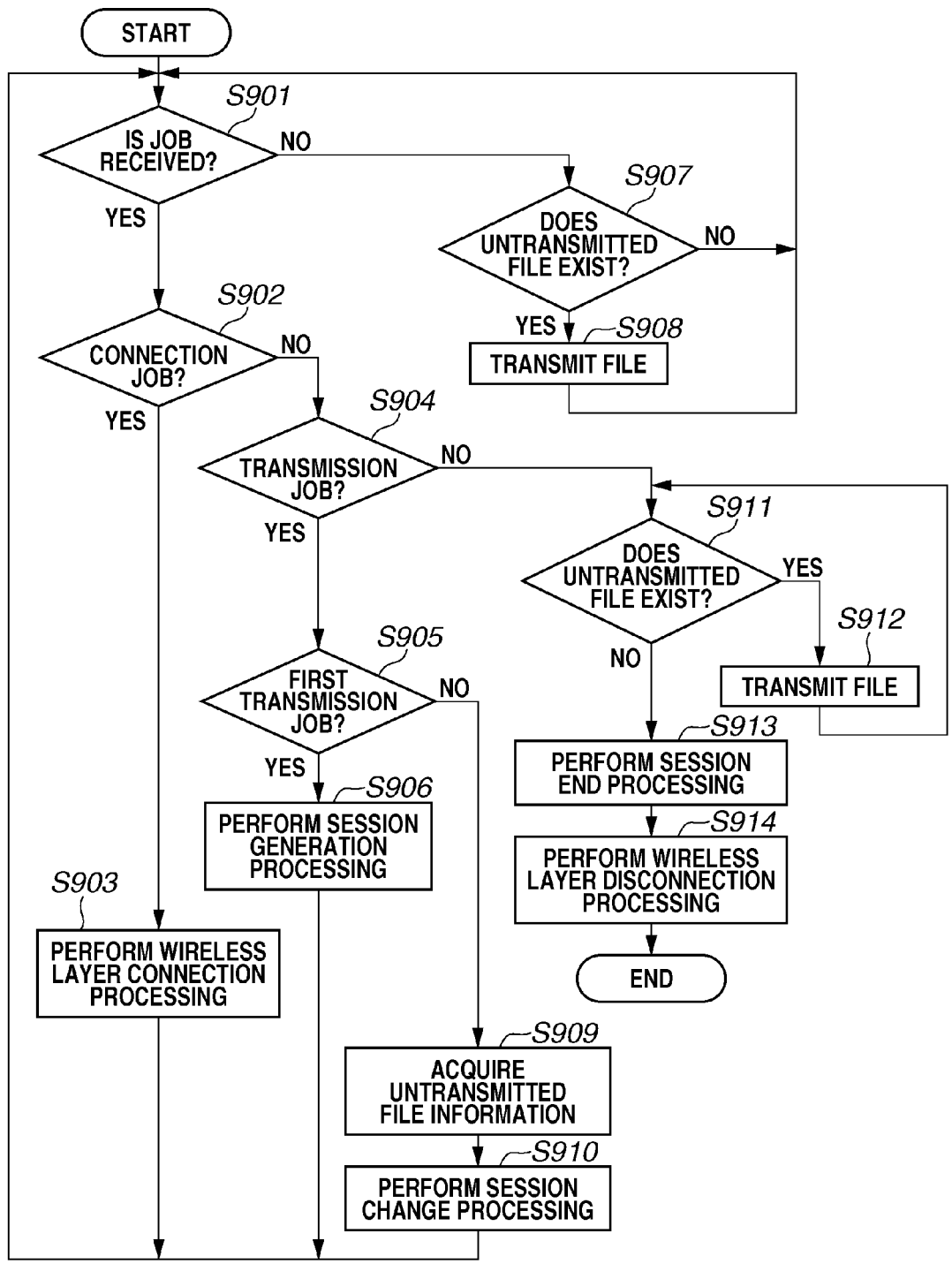
FIG. 9 is a flowchart illustrating processing of a communication task of the communication apparatus according to the first exemplary embodiment.

FIG. 9 is a flowchart illustrating control procedures by the communication task 502 related to the file transmission processing described with reference to FIGS. 4A and 4B. Similar to the UI task 501, the communication task 502 is enabled at the timing when the image transmission mode is started, and disabled at the timing when the image transmission mode is ended. Although description is made as if each task actually executes the processing, each step is executed when the control unit 102 reads a program stored in the storage unit 103 and controls each unit.

In step S901, the communication task 502 determines whether a job is received from the UI task 501.

When it is determined that a connection job has been received (YES in step S902), then in step S903, the communication task 502 performs the wireless layer connection processing. Specifically, the communication task 502 performs the wireless layer connection processing based on the Wi-Fi Direct protocol specification, with a receiving apparatus corresponding to the MAC address included in the parameters of the connection job, and performs the IP address setting processing conforming to the DHCP.

When it is determined that a transmission job has been received (YES in step S904), then in step S905, the communication task 502 determines whether the received transmission job is the first transmission job after wireless layer connection is carried out.

When it is determined that the received transmission job is the first transmission job (YES in step S905), then in step S906, the communication task 502 transmits to the receiving apparatus the transmission target file information included in the parameters of the transmission job, and performs the session generation processing for the file transmitting service.

The processing returns to step S901. When it is determined that the job has not been received from the UI task 501 (NO in step S901), then in step S907, the communication task 502 determines whether an untransmitted image file exists. When an untransmitted image file exists (YES in step S907), then in step S908, the communication task 502 performs processing for transmitting the relevant image file to the receiving apparatus. The image file transmission processing in step S908 is processing for transmitting one image file.

After steps S901, S902, and S904, when it is determined that the received transmission job is not the first transmission job (NO in step S905), then in step S909, the communication task 502 confirms untransmitted transmission target file information. In step S910, the communication task 502 transmits to the receiving apparatus untransmitted transmission target file information and transmission target file information included in the parameters of the transmission job, and performs the session change processing for the file transmitting service. For example, when the untransmitted image file is 2.JPG and the image file specified by the transmission job is 3.JPG, the communication task 502 transmits information about 2.JPG and 3.JPG to the receiving apparatus, and performs the session change processing.

The processing returns to step S901 again. After steps S901 and S902, when it is determined that a disconnection job has been received from the UI task 501 (NO in step S904), then in step S911, the communication task 502 determines whether an untransmitted image file exists. When an untransmitted image file exists (YES in step S911), then in step S912, the communication task 502 performs processing for transmitting the relevant image file to the receiving apparatus. The communication task 502 repeats this processing until there exists no untransmitted image file. When transmission processing is completed for all of transmission target files (NO in step S911), then in step S913, the communication task 502 performs session end processing for the file transmitting service on the receiving apparatus. In step S914, the communication task 502 performs wireless layer disconnection processing.

According to the above-described exemplary embodiments, at the timing when a transmission instruction for the transmission target file is executed, the communication task 502 retransmits the transmission target file information to the receiving apparatus to change the generated session. If there exists no session generated, i.e., at the timing of the first transmission instruction, the communication task 502 performs processing for generating a new session.

Thus, even after starting the image file transmission processing, the user can specify an additional transmission target image file at any time. When an error response is returned from the receiving apparatus in response to the session change processing, the communication task 502 notifies the UI task 501 of the relevant information, and the UI task 501 displays an error response on a GUI screen to enable immediately notifying the user of the error. Thus, a user-friendly user interface can be provided.

Although, in the present exemplary embodiment, the wireless layer connection processing is performed after transmission target files are selected, and then a session generation request is issued, the sequence is not limited thereto. The session generation request may be issued before transmission target files are selected. Modifications in this case applied to the flowchart illustrated in FIG. 9 will be described below.

In this case, a step for executing the session generation processing is appended after step S903, steps S905 and S906 are deleted, and step S909 is executed after step S904. Specifically, the communication task 502 performs the session generation processing after completion of the wireless layer connection processing in step S903. At this time, since no transmission target file is selected, the communication task 502 transmits temporary dummy information to the receiving apparatus.

Subsequently, the communication task 502 does not perform the file transmission processing before reception of a transmission processing instruction from the UI task 501. In step S904, the communication task 502 receives a transmission job from the UI task 501. In step S909, the communication task 502 acquires untransmitted file information. In step S910, since there is no untransmitted file, the communication task 502 transmits only the transmission target file information included in the parameters of the transmission job to the receiving apparatus, and performs the session change processing.

With such an exemplary embodiment, it is also possible to issue a session generation request before transmission target files are selected.

Referring to FIG. 9, although, when it is determined that a disconnection job has been received from the UI task 501, the communication task 502 does not perform step S913 until all of untransmitted image files have been transmitted, however, the processing is not limited thereto. Control may be performed to immediately perform the session end processing by assigning a high priority to the disconnection job. It is also possible to allow the user to select which processing is to be assigned a higher priority.

In the first exemplary embodiment, each transmission job has the same priority and is transmitted from the UI task 501. A second exemplary embodiment will be described below based on a case where the user can set the priority for file transmission when image files are selected.

The present exemplary embodiment will be described below focusing on its features, and descriptions similar to those in the first exemplary embodiment will be omitted. Specifically, the configuration of each communication apparatus and the network configuration according to the present exemplary embodiment are similar to those according to the first exemplary embodiment (FIGS. 1, 2, and 3), redundant descriptions thereof will be omitted.

Figure 10:
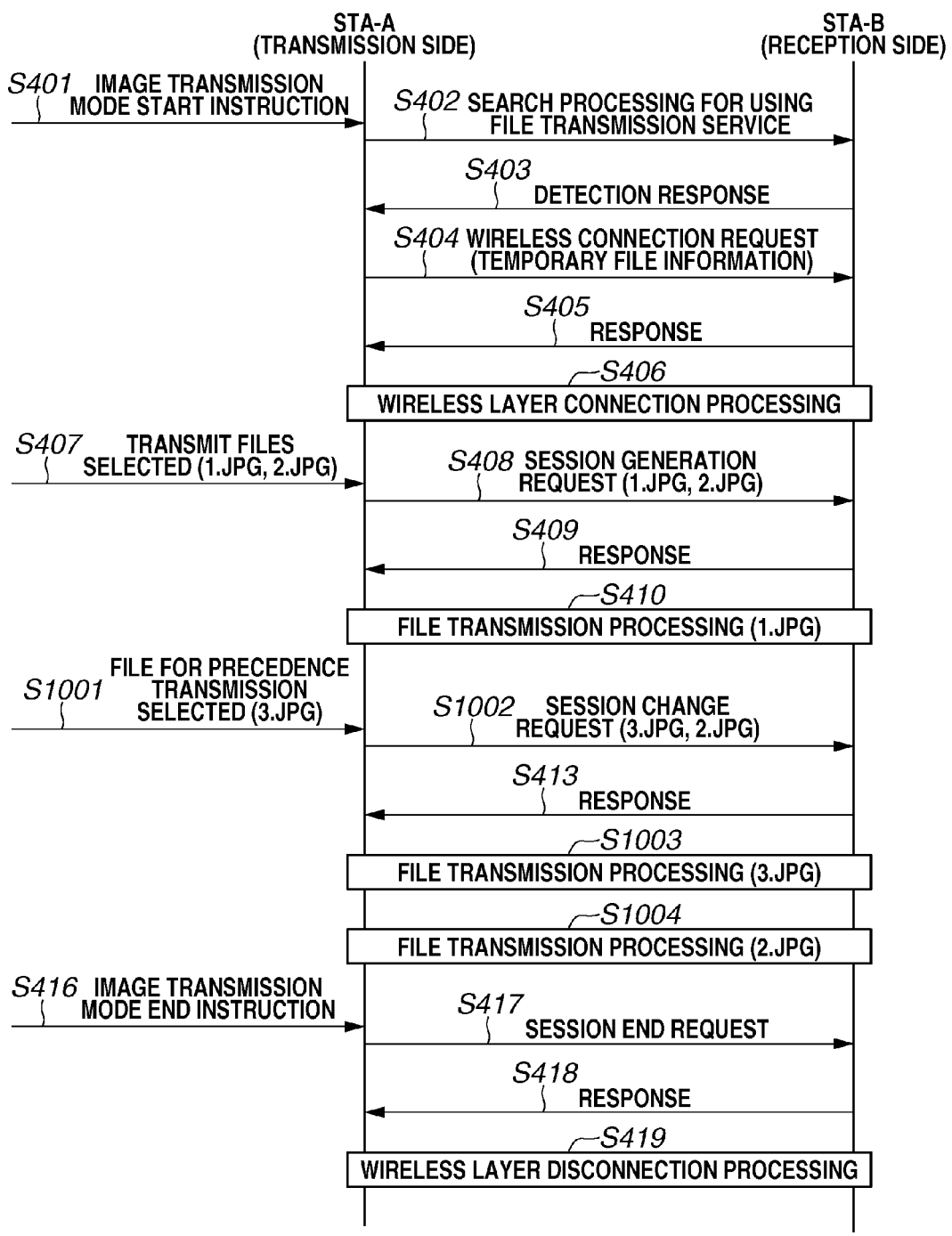
FIG. 10 is a sequence diagram illustrating communications between communication apparatuses according to a second exemplary embodiment.

FIG. 10 is a schematic view illustrating operating sequences between relevant apparatuses in a case where the STA-A transmits image files stored in the storage unit 103 to the STA-B. Only differences from the operating sequences illustrated in FIGS. 4A and 4B will be described below.

When transmission of one image file (1.JPG) is completed in step S410, then in step S1001, one image file (3.JPG) is selected as a transmission target file having a higher priority through a user operation. Various file selection methods can be considered, for example, a method for providing a special menu such as "Precedence Transmission" in the transmission target file selection screen, and assigning a high priority to files selected through the relevant menu. This method will be described in detail below. Alternatively, priority may be preset according to the file format. For example, a method for assigning to still image files and musical files having a small file size a priority higher than the priority of moving image files having a larger file size.

In step S1002, the STA-A acquires information about untransmitted transmission target files and information about selected transmission target files, transmits to the STA-B the transmission target file information arranged so that precedence transmission target image files come first, to request it to change the relevant session order (session change request). Specifically, the session change request includes information about 3.JPG and 2.JPG. The information indicating 3.JPG includes a precedence flag (described below) set to an effective value.

In steps S1003 and S1004, upon reception of the success response in step S413, the STA-A performs processing for transmitting the image files (3.JPG, 2.JPG) to the STA-B based on the changed transmission target file information.

FIG. 11 illustrates job data format specifications according to the present exemplary embodiment.

The job data format illustrated in FIG. 11 is different from that illustrated in FIG. 6B in that the precedence flag is appended to the file information included in the parameters of a transmission job.

Figure 12:
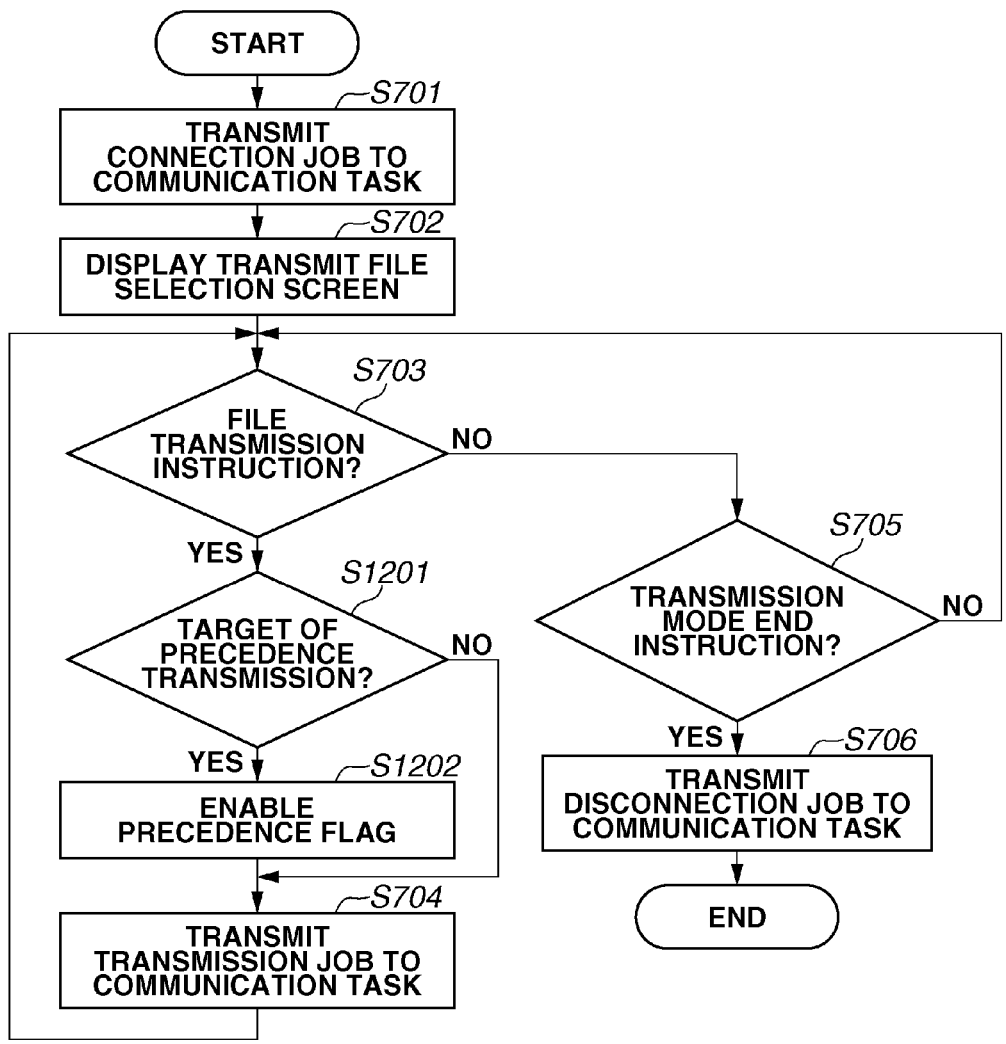
FIG. 12 is a flowchart illustrating processing of a UI task of the communication apparatus according to the second exemplary embodiment.

FIG. 12 is a flowchart illustrating control procedures by the UI task 501 related to the file transmission processing described with reference to FIG. 10. Only key points different from the control procedures illustrated in FIG. 7 will be described below.

When the UI task 501 determines that a transmission target file is selected by the user and a transmission instruction is accepted in the transmission target file selection screen (YES in step S703), then in step S1201, the UI task 501 determines whether the image file is a precedence transmission target. When the image file is determined to be a precedence transmission target (YES in step S1201), then in S1202, the UI task 501 enables the precedence flag of the parameters of the transmission job. In step S704, the UI task 501 transmits the transmission job to the communication task 502.

Upon reception of the transmission job having the enabled precedence flag, the communication task 502 transmits to the receiving apparatus the transmission target file information to the effect that an image file having the enabled precedence flag will be first transmitted, when performing the session change processing in step S910 described in the first exemplary embodiment or the session generation processing in step S906. The transmission order of actual file transmission processing in steps S908 and S912 conforms to the above-described information.

Figure 13A:
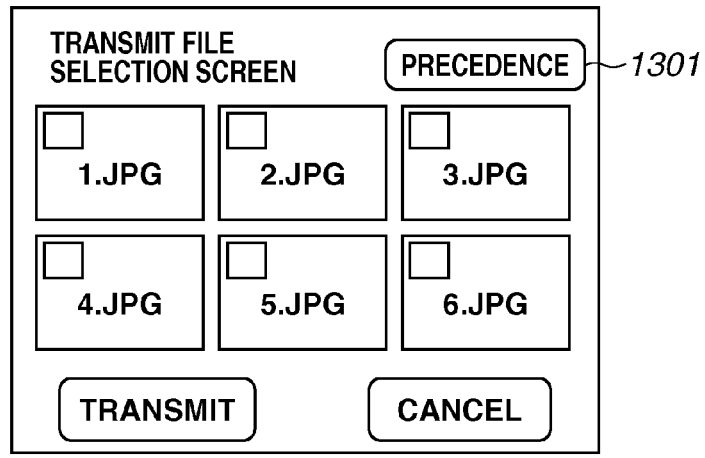
FIGS. 13A, 13B, and 13C illustrate examples of a GUI screen of the communication apparatus according to the second exemplary embodiment.
Figure 13B:
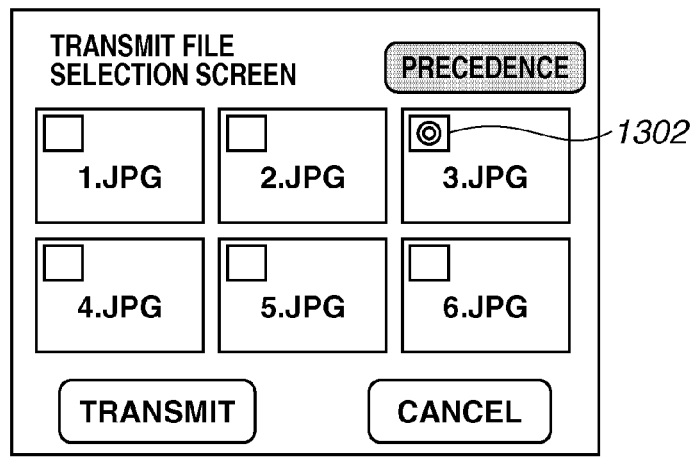
Figure 13C:
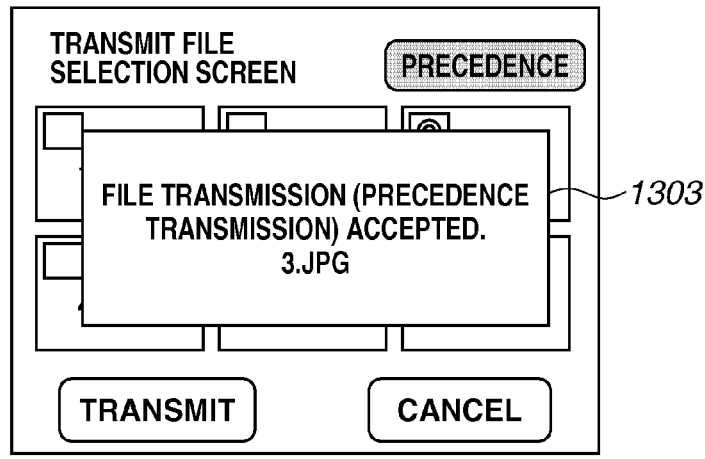

FIGS. 13A, 13B, and 13C illustrate examples of a transmission target file selection screen according to the present exemplary embodiment. Only differences from the relevant screen illustrated in FIGS. 8A, 8B, and 8C will be described below.

FIG. 13A illustrates the transmission target file selection screen displayed in step S702. The transmission target file selection screen includes a PRECEDENCE button 1301. Referring to FIG. 13A, the transmission target file selection screen is in an initial state, and, therefore, PRECEDENCE button 1301 is not selected.

FIG. 13B illustrates the transmission target file selection screen in a state where the PRECEDENCE button 1301 is selected and an image file (3.JPG) is selected. A check box 1302 indicates that the relevant precedence transmission target image file is selected.

FIG. 13C illustrates a screen displayed when step S704 is executed in the screen illustrated in FIG. 13B. A pop-up screen 1303 notifies the user that step S704 has been executed, and notifies the name of the target transmission file.

According to the above-described exemplary embodiments, when an instruction for transmitting the transmission target file selected as a target to be preferentially transmitted is executed, the communication task 502 retransmits to the receiving apparatus the transmission target file information changed such that the target image file is preferentially transmitted. Thus, the generated session has been changed.

The above-described processing enables the user to select at any desired timing an additional image file to be transmitted on a precedence basis even after the image file transmission processing has been started in a certain session. From the user's viewpoint, a file to be transmitted on a precedence basis can be selected at any desired timing without caring about the communicating state of file transmission. Thus, a user-friendly user interface can be provided.

The above-described exemplary embodiments are to be considered as examples for embodying the present invention, and the present invention can be modified in diverse ways without departing from the spirit and scope thereof. The above-described first and second exemplary embodiments can be combined. The user may arbitrarily select the first or the second exemplary embodiment according to which each communication apparatus operates.

The above-described exemplary embodiments are based on an exemplary wireless LAN conforming to the IEEE 802.11 series standard. However, the present invention may be embodied based on other wireless communication standards, such as wireless Universal Serial Bus (USB), Multi-Band OFDM Alliance (MBOA), Bluetooth (registered trademark), Ultra Wide Band (UWB), and ZigBee (registered trademark). The present invention may also be embodied by a wired communication medium, such as a wired LAN. The UWB includes Wireless USB, Wireless 1394, and Wireless Networks (WINET).

Further, the present invention is implemented also by performing the following processing. Specifically, software (program) for implementing the above-described functions of the exemplary embodiments is supplied to a system or an apparatus via a network or various storage media. A computer such as a CPU and a microprocessor unit (MPU) of the system or apparatus loads a program code into memory and then executes it. In this case, the program and the storage medium storing the program are included in the present invention.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-094250 filed Apr. 26, 2013, which is hereby incorporated by reference herein in its entirety.

What is claimed is:

1. A communication apparatus capable of communicating with an external apparatus, the communication apparatus comprising:
at least one processor;
a communication interface;
the at least one processor configured to function as at least one of a display control, a designation unit, a session control unit, and a transmission control unit,
a display control unit configured to display candidates of data to be transmitted to the external apparatus, on a display section;
a designation unit configured to designate transmission target data to be transmitted to the external apparatus out of the candidates displayed on the display section;
a session control unit configured to control a session for communicating with the external apparatus; and
a transmission control unit configured to transmit, via the communication interface, the transmission target data designated by the designation unit to the external apparatus with the use of the session generated by the session control unit,
wherein, even after data transmission by the transmission unit is started and before the session generated by the session control unit is ended, the designation unit can further designate the transmission target data out of the candidates,
wherein, when the transmission target data is further designated by the designation unit, the session control unit performs control to change information about an already generated session, and
wherein the transmission control unit transmits, via the communication interface, the further designated transmission target data to the external apparatus, with the use of the session changed by the session control unit.

2. The communication apparatus according to claim 1, wherein, when at least one of the transmission target data designated by the designation unit has not been transmitted and transmission target data is further designated by the designation unit, the session control unit changes information about the already generated session so that the transmission target data includes untransmitted data and further the designated data.

3. The communication apparatus according to claim 1, further comprising:
an instruction unit configured to instruct to transmit on a precedence basis at least one of the data displayed on the display section,
wherein, based on an instruction by the instruction unit, the session control unit changes the information about the already generated session.

4. The communication apparatus according to claim 1, wherein the display control unit displays a list of a plurality of data items as the candidates.

5. The communication apparatus according to claim 1, wherein, the display control unit changes and displays a plurality of data items one by one as the candidates.

6. The communication apparatus according to claim 1, wherein the designation unit designates the transmission target data based on a user operation.

7. The communication apparatus according to claim 1, wherein the communication apparatus is a mobile phone.

8. The communication apparatus according to claim 1, wherein the communication apparatus is a digital camera.

9. The communication apparatus according to claim 1, wherein the communication apparatus is a tablet device.

10. A non-transitory computer readable recording medium storing a program that causes a computer to function as a communication apparatus of claim 1.

11. The non-transitory computer readable recording medium according to claim 10, wherein, when at least one of the designated transmission target data has not been transmitted and transmission target data is further designated, the changing changes information about the already generated session so that the transmission target data includes untransmitted data and further the designated data.

12. The non-transitory computer readable recording medium according to claim 10, further comprising:
instructing to transmit on a precedence basis at least one of the data displayed on the display section,
wherein, based on an instruction, the changing changes the information about the already generated session.

13. The non-transitory computer readable recording medium according to claim 10, wherein, the changing changes and displays a plurality of data items one by one as the candidates.

14. The non-transitory computer readable recording medium according to claim 10, wherein the designating designates the transmission target data based on a user operation.

15. A method for controlling a communication apparatus capable of communicating with an external apparatus, the method comprising:
displaying candidates of data to be transmitted to the external apparatus on a display section;
designating transmission target data to be transmitted, via a communication interface, to the external apparatus out of the candidates displayed on the display section;
generating a session for communicating with the external apparatus;
further designating, after the data transmission of the designated transmission target data to the external apparatus is started and before the session generated by the session control unit is ended, the transmission target data out of the displayed candidates with the use of the generated session;
changing, when the transmission target data is further designated, information about the already generated session; and
transmitting, via the communication interface, the further designated transmission target data to the external apparatus with the use of the changed session.

16. The method according to claim 15, wherein, when at least one of the designated transmission target data has not been transmitted and transmission target data is further designated, the changing changes information about the already generated session so that the transmission target data includes untransmitted data and further the designated data.

17. The method according to claim 15, further comprising:

instructing to transmit on a precedence basis at least one of the data displayed on the display section, wherein, based on an instruction, the changing changes the information about the already generated session.

18. The method according to claim 15, wherein the displaying displays a list of a plurality of data items as the candidates.

19. The method according to claim 15, wherein, the changing changes and displays a plurality of data items one by one as the candidates.

20. The method according to claim 15, wherein the designating designates the transmission target data based on a user operation.

* * * * *